United States Patent
Legner

(10) Patent No.: US 8,333,131 B2
(45) Date of Patent: Dec. 18, 2012

(54) DRIVETRAIN DEVICE OF A VEHICLE WITH A GEAR UNIT TO ACTUATE DIFFERENT GEAR RATIOS

(75) Inventor: Jurgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 459 days.

(21) Appl. No.: 12/707,979

(22) Filed: Feb. 18, 2010

(65) Prior Publication Data
US 2010/0236361 A1    Sep. 23, 2010

(30) Foreign Application Priority Data

Mar. 17, 2009 (DE) .......................... 10 2009 001 601

(51) Int. Cl.
*F16H 47/00* (2006.01)
(52) U.S. Cl. ...................... 74/730.1; 74/733.1; 74/810.1
(58) Field of Classification Search ................. 74/730.1, 74/732.1, 733.1, 810.1
See application file for complete search history.

(56) References Cited

U.S. PATENT DOCUMENTS

| | | | | | |
|---|---|---|---|---|---|
| 2,100,191 | A | * | 11/1937 | Lapsley | ............................ 60/342 |
| 2,341,512 | A | * | 2/1944 | Burtnett | ........................ 475/113 |
| 2,616,261 | A | * | 11/1952 | Huntington | ...................... 60/361 |
| 2,839,011 | A | * | 6/1958 | Kugel | ............................ 105/96.2 |
| 3,159,054 | A | * | 12/1964 | Gros | ............................ 74/730.1 |
| 3,273,515 | A | | 9/1966 | Oestreicher et al. | |
| 5,787,756 | A | | 8/1998 | Leber et al. | |
| 5,890,981 | A | | 4/1999 | Coutant et al. | |
| 6,056,657 | A | | 5/2000 | Garnett | |
| 2002/0193198 | A1 | * | 12/2002 | Naunheimer | ................. 475/116 |
| 2009/0319135 | A1 | | 12/2009 | Petzold et al. | |

FOREIGN PATENT DOCUMENTS

| | | |
|---|---|---|
| CH | 418 382 | 2/1967 |
| DE | 2 322 457 | 11/1974 |
| DE | 23 54 280 A1 | 5/1975 |
| DE | 43 23 358 C1 | 5/1994 |
| DE | 44 44 843 A1 | 6/1996 |
| DE | 197 51 993 A1 | 5/1998 |
| DE | 102 16 002 A1 | 5/2003 |
| DE | 102 59 424 A1 | 7/2004 |
| DE | 10 2005 060 992 A1 | 6/2007 |
| DE | 10 2006 060 014 A1 | 6/2007 |
| DE | 10 2006 018 435 A1 | 11/2007 |
| DE | 10 2006 030 791 A1 | 1/2008 |
| DE | 10 2006 040 476 A1 | 3/2008 |
| DE | 10 2007 018 999 A1 | 10/2008 |
| DE | 10 2007 021 436 A1 | 11/2008 |
| WO | 2006/042434 A1 | 4/2006 |
| WO | 2008/000602 A1 | 1/2008 |
| WO | 2008/128865 A1 | 10/2008 |
| WO | 2008/135158 A1 | 11/2008 |

* cited by examiner

*Primary Examiner* — Ha D. Ho
(74) *Attorney, Agent, or Firm* — Davis & Bujold, PLLC

(57) ABSTRACT

A device (2) for a vehicle drivetrain (1) with a transmission unit (3) for changing various transmission ratios. The device (2) comprising a reversing gear system (4) arranged on an input side of the transmission for reversing the rotational direction. A hydrodynamic torque converter device (5) located upstream of the reversing gear system (4). A hydraulic device (6) which, in the power flow direction is located between the reversing gear system (4) and the transmission unit (3) and can be brought into active connection with them for producing a torque that can be applied in the area between the reversing gear system (4) and the transmission unit (3).

12 Claims, 2 Drawing Sheets

DRIVETRAIN DEVICE OF A VEHICLE WITH A GEAR UNIT TO ACTUATE DIFFERENT GEAR RATIOS

This application claims priority from German patent application serial no. 10 2009 001 601.5 filed Mar. 17, 2009

FIELD OF THE INVENTION

The invention concerns a device for a vehicle drivetrain with a transmission unit for changing various transmission ratios.

BACKGROUND OF THE INVENTION

A multi-gear reversing gear system that can be shifted under load is known from DE 44 44 843 A1. To produce a short structure in the axial direction a single shifting clutch, a loose wheel and up to two fixed wheels are arranged on each countershaft. Gearwheels of the reversing gear system form a drive input gearset, a distribution gearset and a drive input gear chain. Besides the transmission ratio of the input gearset, to obtain a different transmission ratio related to another shifting clutch, besides the drive input gearset an independent drive chain consisting of a fixed wheel and a loose wheel with a shifting clutch is provided. With the same structure in principle, different transmission variants with different numbers of gears and different axle spacings can be made. The reversing gear system is particularly suitable for use in construction machines.

A motor drives an input shaft of the reversing gear system, this input shaft being connected in a rotationally fixed manner to a pump wheel of a hydrodynamic torque converter. A turbine wheel of the hydrodynamic torque converter transmits the drive power to a hollow shaft positioned concentrically with the input shaft.

Unfortunately, during braking operation of a vehicle made with the reversing gear system or during the operation of its brakes, there is no recuperation function for the recovery of energy.

A hydrostatic drive with recovery of braking energy is described in DE 10 2005 060 992 A1. The hydrostatic drive comprises a hydro-pump and a hydro-motor connected with one another by a first working line and a second working line. In addition, the hydrostatic drive comprises a storage element for the storage of pressure energy, which is connected to an inlet-side connection of the hydro-pump for the recovery of the stored energy.

By means of the hydrostatic drive a vehicle can be driven in both the forward and the reverse directions, and this forward and reverse driving of the vehicle can be carried out with or without the involvement of the storage element. This means that by the hydrostatic drive, starting from the hydro-pump, a torque of the working machine actively connected with the hydro-pump can be transmitted to the hydro-motor and from there, during traction operation, to the drive input of the vehicle. In contrast, starting from the drive input of the vehicle, a drive output torque can be transmitted by the hydro-motor and supported in the area of the working machine.

During both traction and thrust operation of the vehicle drivetrain made with the hydrostatic drive, energy in the form of hydraulic pressure can be stored in the area of the storage element, or the closed hydraulic circuit that connects the hydro-pump and the hydro-motor to one another can be pressurized and this pressure converted into torque in the area of the hydro-pump and the hydro-motor.

When the hydrostatic drive relates to a vehicle drive, the adjustable hydro-motor is connected via a drive output shaft to a vehicle drive, which can be a wheel drive, a differential transmission or a downstream power shift transmission or manual transmission.

The hydrostatic drive is of complex design and structure, and in addition can only be operated by virtue of elaborate control and regulation means, which however, is undesirable.

Furthermore, a drive torque of the working machine always has to be passed by the hydrostatic drive in the direction of the vehicle drive, whereby the efficiency of a vehicle drivetrain made with the hydrostatic drive is reduced by comparison with the reversing gear system designed in accordance with DE 44 44 843 A1.

SUMMARY OF THE INVENTION

Accordingly, the purpose of the present invention is to make available a device for a vehicle drivetrain with a transmission unit for changing various transmission ratios, by means of which a vehicle can be operated over a large operating range with high efficiency and by means of which at least recuperative operation and hybrid operation are possible.

The device according to the invention for a vehicle drivetrain with a transmission unit for varying different transmission ratios is made with a reversing gear system arranged on the transmission input side for bringing about a reversal of the rotation direction, a hydrodynamic torque converter device upstream from the reversing gear system, and a hydraulic device that can be brought into active connection with the transmission unit in the power flow between the reversing gear system and the transmission unit. By means of the hydraulic device a torque can be produced, which can be applied in the area between the reversing gear system and the transmission unit.

Owing to its various possible transmission ratios, a vehicle drivetrain made with the device according to the invention can be operated with high efficiency both in forward and reverse drive, since drive torque of a drive machine to be transmitted by the device can be transmitted directly from the drive machine to a vehicle drive input or a drive output of the vehicle drivetrain. This results from the fact that the drive torque of the drive machine is not transmitted, via the hydraulic device, to the vehicle drive output, but is passed on directly by the reversing gear system and the transmission unit.

In a simple manner the connection of the hydraulic device between the reversing gear system and the transmission unit makes it possible to use the functionality of the hydraulic device over the full operating range of the vehicle drivetrain. In addition, owing to its connection on the transmission input side, the power that has to be provided by the hydraulic device is always low, since it is adapted by the transmission ratio engaged in the area of the transmission unit to the operating condition of the vehicle drivetrain at the time, and is supplied correspondingly transformed to the drive output of the vehicle drivetrain.

Moreover, in combination with a converter power shift transmission the hybrid system proposed according to the invention offers the advantage that by virtue of the additional hydraulic drive, unsuitable operating points of the hydrodynamic torque converter can be avoided in a simple manner. For example, during operating conditions characterized by a high traction force demand, large power losses during slipping operation in the area of the hydrodynamic torque converter can be reduced by introducing a drive torque produced in the area of the hydraulic device, since during such operating conditions a torque in the area of the hydraulic device can be made available with greater efficiency than in the area of the hydrodynamic torque converter. Operating conditions of the type just described occur frequently in the case of construction machines made as wheel loaders during the process of filling the scoops.

In an advantageous further development of the device according to the invention, a plurality of range clutches are provided in the area of the output of the transmission unit in order to produce various transmission ratio ranges, within each of which the transmission ratio of the transmission unit is continuously variable. Thus, a vehicle made with the device can be operated over a large range of speeds, optimally adapted to the operating condition of the vehicle in each case.

Particularly when the hydraulic device is arranged in a universal shaft line, to protect the hydraulic device against sustained overspeeding at high driving speeds, which can permanently impair its function, in an advantageous embodiment of the device according to the invention the hydraulic device can be connected by a clutch to the vehicle drivetrain.

A simply designed further development of the device according to the invention, which can be actuated with little effort, comprises a hydraulic device which can be brought into active connection, via a gearwheel, with a gearwheel of the reversing transmission.

An embodiment of the device according to the invention which is advantageous in terms of structural space comprises a hydraulic machine of the hydraulic device that can be operated in both rotational directions.

To be able, in a simply designed manner, to provide drive torque at the drive output of the vehicle drivetrain by means of the hydraulic device, or at least partially to support drive output torque of the vehicle drivetrain in that area and preferably to be able to recover braking energy in the area of the hydraulic device, in an advantageous further development of the device according to the invention the hydraulic machine is actively connected on its pressure side to a pressure medium container unit and on its intake side to a hydraulic fluid reservoir.

A further development of the invention characterized by a structure of simple design comprises, between the pressure side of the hydraulic machine and the pressure medium container unit, a one-way valve that can be actuated and which, if there is a positive pressure gradient between the pressure medium container unit and the pressure side of the hydraulic machine, blocks the connection between them.

In a further advantageous embodiment of the device according to the invention the hydrodynamic torque converter device is associated with a converter bridging clutch by means of which, especially when driving rapidly with lower traction forces, the hydrodynamic torque converter can be bridged in order to operate a vehicle drivetrain made with the device according to the invention with high efficiency

BRIEF DESCRIPTION OF THE DRAWINGS

Other advantages and advantageous further developments of the invention emerge from the claims and from the example embodiment whose principle is described with reference to the drawing, which shows:

DETAILED DESCRIPTION OF THE PREFERRED EMBODIMENTS

Figure 1:
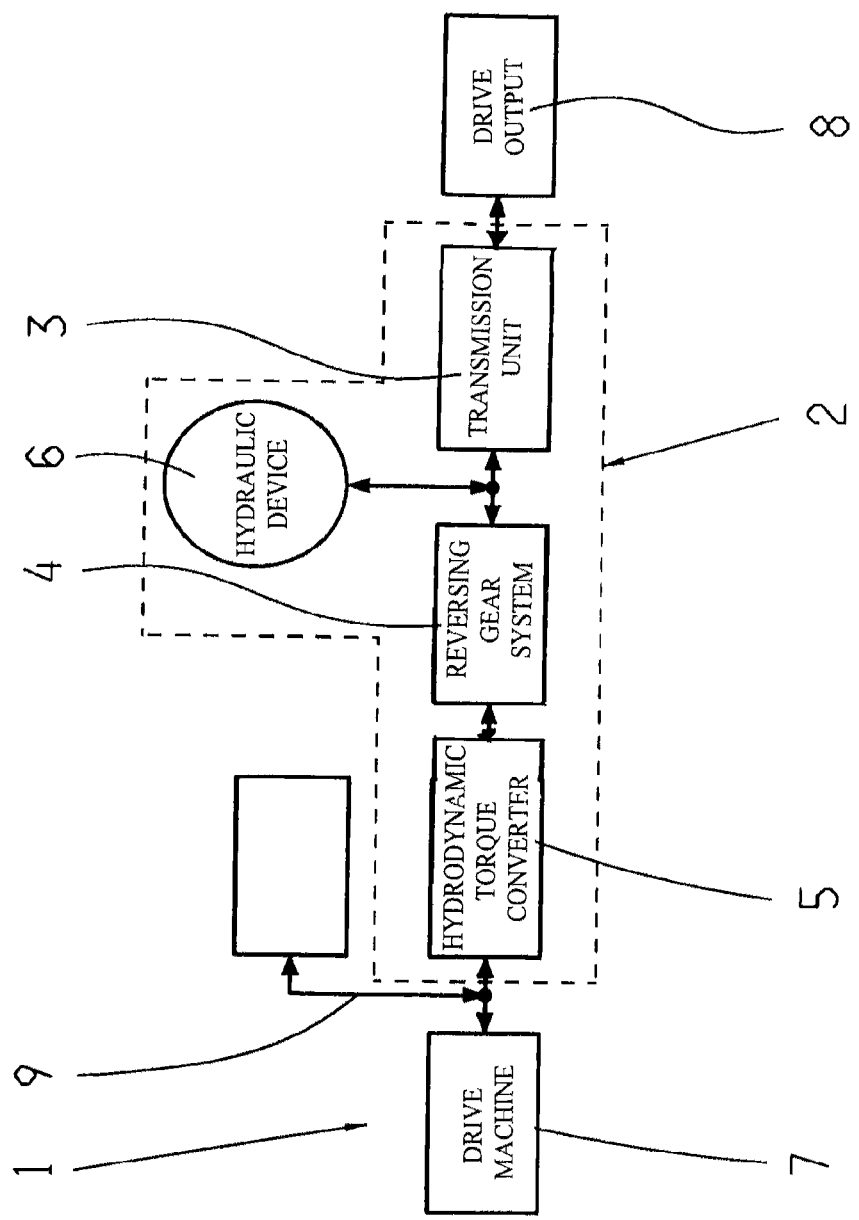
FIG. 1: A very schematic representation of a vehicle drivetrain made with the device according to the invention.

FIG. 1 is a very schematic representation of a vehicle drivetrain 1 with a device 2, which comprises a transmission unit 3 for changing various transmission ratios, a reversing gear system 4 arranged on the transmission input side, a hydrodynamic torque converter device 5 upstream from the reversing gear system 4 and a hydraulic device 6 which, in the power flow between the reversing gear system 4 and the transmission unit 3, can be brought into active connection with them. By means of the device 2 a maximum of six forward gears and three reverse gears can be produced. In the area of the reversing gear system 4, to bring about a reversal of the rotational direction in the vehicle drivetrain 1, the reversing system 4 can be switched between operating modes for forward and for reverse driving of the vehicle drivetrain 1.

By means of the hydraulic device 6 a torque can be produced, which can be applied in the area between the reversing gear system 4 and the transmission unit 3 in the force flow of the vehicle drivetrain 1. Thus, for example during traction operation of the vehicle drivetrain 1, it is possible for the hydraulic device 6 to make available a drive torque in the area of the drive output 8 of the vehicle drivetrain 1. Moreover, during thrust operation of the vehicle drivetrain 1 a drive output torque of the vehicle drivetrain 1 can be supported at least partially in the area of the hydraulic device 6 of the vehicle drivetrain 1. During thrust operation of the vehicle drivetrain 1, in the area of the hydraulic device 6 at least part of the drive output torque to be supported can be used for energy recovery by operating the hydraulic device 6 in a recuperation mode, as described later.

The device 2 is arranged between a drive machine 7 and a drive output 8 of the vehicle drivetrain 1, and in the connection area between the drive machine 7 and the device 2 auxiliary drive outputs of a vehicle made as a construction machine are connected via a so-termed Power-Take-Off (PTO) driveshaft 9 to the force flow of the vehicle drivetrain 1, and can therefore be driven directly by the drive machine 7.

Figure 2:
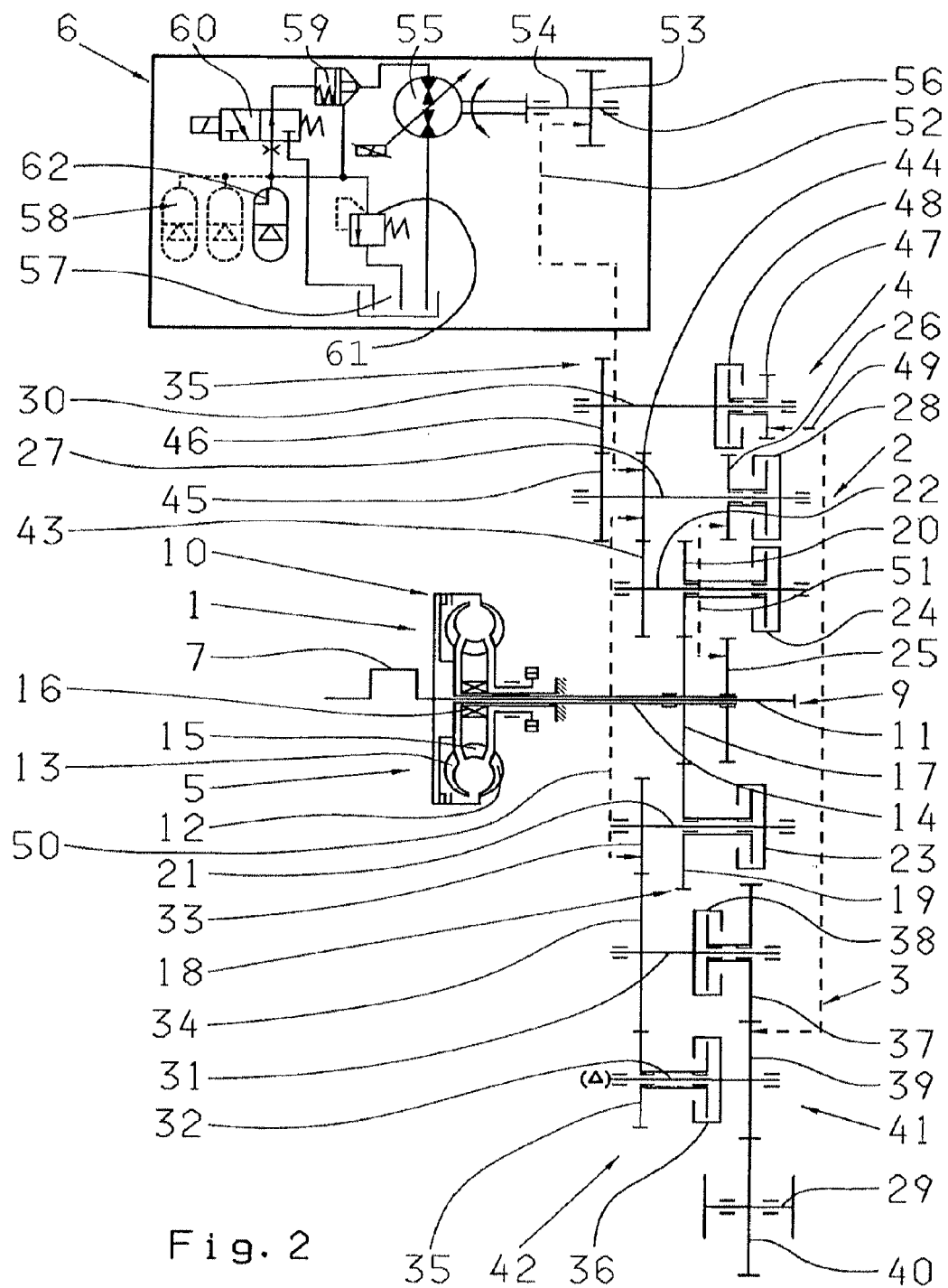
FIG. 2: A more detailed view of the vehicle drivetrain shown in FIG. 1

FIG. 2 shows a hydraulic circuit diagram of the hydraulic device 6 and a gearing layout comprising the reversing gear system 4, the transmission unit 3 and the drive output 8 of the vehicle drivetrain 1. Moreover, the hydrodynamic torque converter device 5 on the transmission output side is shown, which can be bridged by a converter bridging clutch 10 particularly when driving rapidly with low traction forces in order to be able to operate the vehicle drivetrain 1 with high efficiency.

In this vehicle drivetrain 1 unfavorable operating points of the hydrodynamic torque converter device 5 can be avoided by virtue of the hydraulic device 6. For example, during operating condition variations with a high traction force demand, during which there is pronounced slip in the area of the hydrodynamic torque converter device 5 and high power loss is occurring, there exists the possibility of reducing the power loss by providing an additional drive torque. This follows from the fact that in such operating conditions of the vehicle drivetrain the hydraulic device 6 can be operated with better efficiency. The last-mentioned operating conditions occur particularly with wheel loaders during scoop filling processes. During transport operation of a vehicle made with the vehicle drivetrain 1, the delivery volume of the hydraulic device 6 is preferably set to zero to enable the vehicle drivetrain 1 to be operated with high efficiency.

The drive machine 7 is connected to an input shaft of the reversing gear system 4, whereby in this area of the vehicle drivetrain 1 a drive torque of the drive machine 7 can be applied or, when the vehicle drivetrain 1 is in thrust operation, a thrust torque applied by the drive output 8 can be supported at least partially in the area of the drive machine 7. In addition, the drive machine 7 is connected by the input shaft 11 directly to the PTO driveshaft 9 to be able to power auxiliary drives of a construction machine or suchlike made with the vehicle drivetrain 1, at the speed of the drive machine.

A pump impeller wheel 12 of the hydrodynamic torque converter device 5 is connected in a rotationally fixed manner to the input shaft 11 of the reversing gear system 4. A turbine wheel 13 of the hydrodynamic torque converter device 5 transmits the drive power of the drive machine 7 to a hollow shaft 14, which is arranged concentrically to the input shaft 11. In a known manner, the hydrodynamic torque converter device 5 is made with a guide wheel 15 that can be supported by a free-running wheel 16.

A fixed wheel 17 connected in a rotationally fixed manner to the hollow shaft 14 forms the input gear of a drive gearset 18. Besides the fixed wheel 17, the drive gearset 18 has loose wheels 19 and 20 such that the teeth of the fixed wheel 17 mesh permanently with the loose wheels 19 and 20. The loose wheels 19 and 20 are respectively mounted on one of the countershafts 21 and 22.

A shifting clutch 23 is associated with the loose wheel 19 and a shifting clutch 24 with the loose wheel 20. On the hollow shaft 14 is arranged in a rotationally mixed manner a further fixed wheel 25 whose teeth engage permanently with a loose wheel 26. The loose wheel 26 is mounted on a countershaft 27 and a shifting clutch 28 is associated with the loose wheel 26.

By virtue of the two fixed wheels 17 and 25, besides the drive gearset 18 an independent drive chain is formed, which consists of the fixed wheel 25 and the loose wheel 26. With constant axle-base separations the transmission ratio within the drive gearset 18 between the range or shifting clutch 23 and the range or shifting clutch 24 cannot be changed. The independent drive chain makes it possible to provide different transmission ratios in relation to the shifting clutch 28, which are independent of the transmission ratio of the drive gearset 18. Thus, for driving the shifting clutch 24, the teeth of the fixed wheel 17 of the drive gearset are decoupled.

When the clutch 23 is engaged the loose wheel 19 is connected in a rotationally fixed manner to the countershaft 21. The loose wheel 20 is coupled to the countershaft 22 when the clutch 24 is actuated correspondingly. When the clutch 28 is engaged there is a rotationally fixed connection between the loose wheel 26 and the countershaft 27. The rotational direction of a drive output shaft 29, as described earlier, can be produced by virtue of the clutches 23, 24 and 28, this shaft 29 being an output shaft of the reversing gear system 4. For that reason, the clutches 23, 24 and 28 can be termed direction clutches of the device 2.

Besides the countershafts 21, 22 and 27 and the drive output shaft 29, the reversing gear system is made with further countershafts 30 to 32. On the countershaft 21, besides the loose wheel 19, a fixed wheel 33 is arranged, whose teeth are permanently engaged with a further fixed wheel 34. Depending on the operating condition, the fixed wheel 34 performs the function of an intermediate wheel. On the countershaft 32 is mounted a loose wheel 35 which engages with the fixed wheel 34 on the countershaft 31. Associated with the loose wheel 35 is a clutch 36 by which the loose wheel 35 can be connected in a rotationally fixed manner to the countershaft 32.

Mounted to rotate on the countershaft 31 is a loose wheel 37, which can be connected in a rotationally fixed manner to the fixed wheel 34 by a further clutch 38. When the clutch 31 is engaged the drive power is transmitted between the drive machine 7 and the drive output 8, via the loose wheel 37, to a fixed wheel 39 of the countershaft 32. On the drive output shaft 29 of the transmission unit 3 is arranged a fixed wheel 40, which is permanently in driving connection with the fixed wheel 39 of the countershaft 32. The loose wheel 37 and the fixed wheels 39 and 40 again form a drive wheel chain 41.

The fixed wheels 33, 34 and the loose wheel 35 form a distributor gearset 42 which is completed by a further fixed wheel 43 of the countershaft 32, two fixed wheels 44 and 45 of the countershaft 27 and a fixed wheel 46 of the countershaft 30.

Mounted to rotate on the countershaft 30 is a loose wheel 47 which can be connected in a rotationally fixed manner to the countershaft 30 by a clutch 48. The teeth of the loose wheel 47 mesh permanently with the fixed wheel 39, this meshing being represented graphically by a line 49 in the drawing plane of FIG. 2. Thus, the lose wheel 47 is also part of the drive wheel chain 41.

The fixed wheel 34 meshes with the fixed wheel 44 of the distributor gearset 42, the spatial position of the meshing lying outside the plane of the drawing and being represented by a line 50 in the drawing plane of FIG. 2. The loose wheel 26 of the countershaft 27 meshes with the fixed wheel 25, this meshing in the drawing plane of FIG. 2 being represented graphically by a line 51.

Besides the direction clutches 23, 24 and 28, the clutches 48, 38 and 36 are used to produce the various transmission ratios and constitute so-termed gear or range clutches, such that a transmission ratio or gear is in each case engaged by engaging one direction clutch and one gear clutch. The clutch 28 is both a direction and a gear clutch.

Besides the loose wheel 26, the fixed wheels 44 and 45 of the distributor gearset 42 are mounted on the countershaft 27. The speed and rotational direction of all the gearwheels of the distributor gearset 42 are defined by actuating one of the direction clutches 23, 24 and 28. Besides the clutches 48, 38 and 36, on the countershafts 30, 31 and 32 are arranged, respectively, a fixed wheel 46, 34 and a loose wheel 35 of the distributor gearset 42 and, respectively, a loose wheel 47, 37 and a fixed wheel 39 of the drive wheel chain 41.

The hydraulic device 6 is coupled, via a pair of gearwheels 52, to the vehicle drivetrain 1 in the area between the direction or reversing clutches 23, 24 and 28 and the gear clutches 48, 38 and 36. The gearwheel pair 52 comprises the fixed wheel 44 and a fixed wheel 53 that meshes permanently with it, which is connected in a rotationally fixed manner to an output shaft 54 of a hydraulic machine 55 that can be operated in both rotation directions.

In a simple manner, the above-described connection of the hydraulic device 6 into the power flow of the vehicle drivetrain 1 makes it possible to use all the downstream transmission ratios of the device 2 and to make the hydraulic device 6 compact in relation to its performance and structural dimensions, while at the same time allowing it to be used throughout the speed range of a vehicle constructed with the vehicle drivetrain 1.

The hydraulic machine 55 is designed to swivel in both directions and the intake side and pressure side of the hydraulic machine 55 are identical throughout the operating range of the hydraulic machine 55. The output shaft 54 of the hydraulic machine 55 is connected to an auxiliary drive output shaft 56 by which further auxiliary drive outputs of the vehicle made with the drivetrain 1 can be operated.

On its intake side, the hydraulic machine 55 is actively connected to an essentially unpressurized hydraulic fluid reservoir 57 and on its pressure side, to a pressure medium container unit 58, which in the present case has three containers. The number of containers in the pressure medium container unit 58 varies depending on the application concerned and on the extent of energy storage required. The hydraulic fluid reservoir 57 in the example embodiment of the device 2 represented in the drawing is also the fluid reservoir of the vehicle's working machine. In other embodiments of the device the hydraulic fluid reservoir of the device is made separately from the fluid reservoir of the working machine, which emphasizes the modular character of the device according to the invention.

Between the pressure side of the hydraulic machine 55 and the pressure medium container unit 58 is arranged a one-way valve device 59 that can be actuated, which blocks the connection between the hydraulic machine 55 and the pressure medium container unit 58, if there exists a positive pressure gradient between the pressure medium container unit 58 and the pressure side of the hydraulic machine 55. The one-way valve device 59 can be actuated by a 3/2-way valve 60 whereby the response behavior of the one-way valve device 59 can be varied as a function of pressure.

To be able to limit a maximum operating pressure of the hydraulic device 6, the hydraulic device 6 comprises a pressure-limiting valve device 61. In addition, a reservoir pressure of the pressure medium container unit 58 is determined by a pressure sensor 62. The pressure signal from the pressure sensor 62 is used for the operating strategy of the hybrid drive of the vehicle drivetrain 1. For example, if a reservoir pressure close to the gas filling pressure is determined, the absorption volume of the hydraulic machine 55 is reduced to zero. During transport operation the conveyor volume of the hydraulic machine 55 is also set to zero.

If a positive torque or drive torque is to be introduced into the force flow of the vehicle drivetrain 1, the connection between the pressure medium container unit 58 and the hydraulic machine 55 is opened in the area of the unblockable one-way valve 59 by appropriate switching of the 3/2-way valve 60. The pressure medium stored in the pressure medium container unit 58 then drives the hydraulic machine 55, in the area of which the hydraulic pressure is converted into mechanical energy. Thus, during the drive mode of the hydraulic machine 55 the pressure medium from the pressure medium container unit 58 used is delivered to the hydraulic machine 55 via its pressure side and then passed into the hydraulic fluid reservoir 57 via the suction side of the hydraulic machine 55.

During a recuperative operation of the hydraulic device 6, part of the drive output torque to be supported is passed, via the gearwheel pair 52, into the hydraulic machine 55. The hydraulic machine 55 draws hydraulic fluid out of the hydraulic fluid reservoir 57 and pumps it, via the one-way valve device 59 which opens above a pre-set pressure level, into the pressure medium container unit 58. If a maximum operating pressure is reached in the area of the pressure limiting valve device 61, the pressure limiting valve device 61 opens a connection upstream from the pressure medium container unit 58 between the pressure side of the hydraulic machine 55 and the hydraulic fluid reservoir, allowing excess hydraulic fluid to flow back into the hydraulic fluid reservoir 57.

The advantage of the hydraulic switching of the hydraulic device 6 is that the hydraulic fluid volume flow passing between the pressure medium container unit 58 and the hydraulic machine 55 in each case for the operation of the hydraulic machine 55 does not pass through the 3/2-way valve 60 but only through the unblockable one-way valve device 59, so that hydraulic losses are small.

Basically, the hydraulic device 6 can be made simply and inexpensively since it consists of conventional structural elements. By virtue of the hybrid device consisting of the hydraulic device 6 and the drive machine 7, the drive machine 7, which can be in the form of a diesel internal combustion engine, can have more compact dimensions compared with conventional vehicle drivetrains. Moreover, by virtue of the hydraulic device 6 so-termed boost operation is possible, and an operating point shift of the drive machine 7 during a pressure medium container unit 58 charging operation by the device is also possible. During transport operation of a vehicle, the delivery volume can preferably be set to zero in order to avoid overloading the hydraulic circuit and undesired power losses due to ineffectual circulation of hydraulic fluid in the area of the hydraulic unit. Furthermore, thanks to the concept according to the invention hydrostatic support can be provided during bulk work.

INDEXES

1 Vehicle drivetrain
2 Device
3 Transmission unit
4 Reversing gear system
5 Hydrodynamic torque converter device
6 Hydraulic device
7 Drive machine
8 Drive output
9 PTO shaft
10 Converter bridging clutch
11 Input shaft
12 Pump impeller wheel
13 Turbine wheel
14 Hollow shaft
15 Guide wheel
16 Freewheel
17 Fixed wheel
18 Drive gearset
19, 20 Loose wheel
21, 22 Countershaft
23, 24 Clutch
25 Further fixed wheel
26 Loose wheel
27 Countershaft
28 Clutch
29 Drive output shaft
30-32 Countershaft
33, 34 Fixed wheel
35 Loose wheel
36 Clutch
37 Loose wheel
38 Clutch
39, 40 Fixed wheel
41 Drive gear chain
42 Distributor gear chain
43-46 Fixed wheel
47 Loose wheel
48 Clutch
49-51 Line
52 Gearwheel pair
53 Fixed wheel
54 Output shaft
55 Hydraulic machine
56 Auxiliary drive output shaft
57 Hydraulic fluid reservoir
58 Pressure medium container unit
59 One-way valve device
60 3/2-way valve
61 Pressure limiting valve device
62 Pressure sensor

The invention claimed is:

1. A device (2) for a vehicle drivetrain (1) with a transmission unit (3) for changing various transmission ratios, a reversing gear system (4) being arranged on a transmission input side for reversing a rotational direction, a hydrodynamic torque converter device (5) being arranged upstream of the reversing gear system (4) and with a hydraulic device (6) located in a power flow between the reversing gear system (4) and the transmission unit (3) and being actively connectable with the reversing gear system (4) and the transmission unit (3) such that a torque, which is applied in an area between the reversing gear system (4) and the transmission unit (3), is produced by the hydraulic device (6).

2. The device according to claim 1, wherein a plurality of range clutches (28, 36, 38, 48) are provided, in an area of an output of the transmission unit (3), for producing various transmission ratio ranges, within which the transmission ratio of the transmission unit (3) can be varied in each case.

3. The device according to claim 1, wherein the hydraulic device (6) is connectable by a clutch device to the reversing gear system (4).

4. The device according to claim 1, wherein the hydraulic device (6) is brought into active connection with a gearwheel (44) of the reversing gear system (4) via a gearwheel (53).

5. The device according to claim 1, wherein the hydraulic device (6) comprises a hydraulic machine (55) which is operable in both rotational directions.

6. The device according to claim 5, wherein the hydraulic machine (55) is actively connected, on a pressure side, with a pressure medium container unit (58) and, on a suction side, to a hydraulic fluid reservoir (57).

7. The device according to claim 6, wherein a one-way valve (59) is arranged between the pressure side of the hydraulic machine (55) and the pressure medium container unit (58) and, when actuated, blocks the connection between the hydraulic machine (55) and the pressure medium container unit (58) if a positive pressure gradient exists between the pressure medium container unit (58) and the pressure side of the hydraulic machine (55).

8. The device according to claim 7, wherein the one-way valve (59) is actuated by a 3/2-way valve (60).

9. The device according to claim 1, wherein the hydraulic device (6) comprises a pressure limiting valve device (61) for limiting a maximum operating pressure.

10. The device according to claim 6, wherein a pressure sensor (62) is provided for monitoring a storage pressure of the pressure medium container unit (58).

11. The device according to claim 1, wherein a converter bridging clutch (10) is associated with the hydrodynamic torque converter device (5).

12. A device (2) for a vehicle drivetrain (1) comprising a transmission unit (3) for changing various transmission ratios, the device comprising:
- a reversing gear system (4) coupled to a transmission input for reversing a rotational direction of drive through the device (2);
- a hydrodynamic torque converter device (5) being located upstream, in a power flow direction, of the reversing gear system (4);
- a hydraulic device (6) being arranged, in the power flow direction, between the reversing gear system (4) and the transmission unit (3), and the hydraulic device (6) being actively connectable with the reversing gear system (4) and the transmission unit (3) such that torque produced by the hydraulic device (6) is applicable to the flow of power between the reversing gear system (4) and the transmission unit (3), a clutch connecting the hydraulic device (6) to the reversing gear system (4), the hydraulic device (6) comprises a hydraulic machine (55) that is operable, in both rotational directions, a pressure side of the hydraulic machine (55) being connected to a one-way valve (59) which is connected to a pressure medium container unit (58), and a suction side of the hydraulic machine (55) being actively connected to a hydraulic fluid reservoir (57); and
the one-way valve (59) being actuatable to block the connection between the hydraulic machine (55) and the pressure medium container unit (58), if a positive pressure gradient exists between the pressure medium container unit (58) and the pressure side of the hydraulic machine (55).

\* \* \* \* \*